United States Patent [19]

Saito

[11] Patent Number: 6,053,832

[45] Date of Patent: Apr. 25, 2000

[54] BELT DRIVING DEVICE HAVING A BELT SHIFT CORRECTING MEMBER

[75] Inventor: Daisuke Saito, Tokyo, Japan

[73] Assignee: Ricoh Company, Ltd., Tokyo, Japan

[21] Appl. No.: 09/161,224

[22] Filed: Sep. 28, 1998

[30] Foreign Application Priority Data

Sep. 27, 1997 [JP] Japan .................................. 9-279738

[51] Int. Cl.$^7$ .............................. F16H 7/22; F16H 55/48; B65G 21/20

[52] U.S. Cl. .......................... 474/122; 474/190; 198/840

[58] Field of Search ................................. 474/119, 121, 474/122, 123, 124, 139, 190, 191

[56] References Cited

U.S. PATENT DOCUMENTS

| | | | |
|---|---|---|---|
| 3,140,621 | 7/1964 | Stone ..................................... | 474/191 |
| 3,142,192 | 7/1964 | Edberg ................................... | 474/191 |
| 3,789,682 | 2/1974 | Holz ...................................... | 474/191 |
| 3,961,736 | 6/1976 | Fatula .................................... | 474/191 |
| 3,972,414 | 8/1976 | Conrad ................................... | 198/840 |
| 4,855,174 | 8/1989 | Kawamoto ............................. | 474/191 |
| 5,181,888 | 1/1993 | Takahashi et al. .................... | 474/123 |
| 5,346,438 | 9/1994 | Gerstenberger et al. .............. | 474/191 |

OTHER PUBLICATIONS

57–72440, Filed on Oct. 22, 1980, (Japanese Utility Model Laid–open Publication—with English Abstract).
57–72441, Filed on Oct. 22, 1980, (Japanese Utility Model Laid–open Publication—with English Abstract).
57–72444, Filed on Oct. 22, 1980, (Japanese Utility Model Laid–open Publication—with English Abstract).

Primary Examiner—Tamara L. Graysay
Assistant Examiner—Matthew A. Kaness
Attorney, Agent, or Firm—Oblon, Spivak, McClelland, Maier & Neustadt, P.C.

[57] ABSTRACT

A belt driving device in which an endless belt is spanned around a drive pulley and a driven pulley and the belt is driven by rotation of the drive pulley includes a belt shift correcting member for correcting shifting of the endless belt. When the endless belt is shifted towards one side in an axial direction of one of the drive pulley and the driven pulley, the belt shift correcting member increases an angle of a circumference of the one of the drive and driven pulleys contacting a width-wise end part of the endless belt at the one side such that the angle of the circumference of the one of the drive and driven pulleys contacting the width-wise end part of the endless belt at the one side is larger at a part of the one of the drive and driven pulleys contacting an edge part of the width-wise end part of the endless belt than at other parts of the one of the drive and driven pulleys contacting other parts of the width-wise end part of the endless belt, and the angle of the circumference of the one of the drive and driven pulleys contacting the width-wise end part of the endless belt decreases toward a part of the one of the drive and driven pulleys contacting a width-wise center part of the endless belt. Furthermore, a coefficient of friction relative to the endless belt is made higher at a circumferential surface of an axial end part of the one of the drive and driven pulleys, which comes in contact with the width-wise end part of the endless belt at the one side in the axial direction of the one of the drive and driven pulleys, than at a circumferential surface of an axial center part of the one of the drive and driven pulleys.

10 Claims, 5 Drawing Sheets

BELT DRIVING DEVICE HAVING A BELT SHIFT CORRECTING MEMBER

BACKGROUND OF THE INVENTION

1. Field of the Invention

The present invention relates to a belt driving device in which an endless belt spans around a drive pulley and a driven pulley and the belt is driven by rotation of the drive pulley, and more particularly to a belt driving device including a belt shift correcting member for correcting shifting of the belt.

2. Discussion of the Background

A belt driving device in which an endless belt spans around a drive pulley and a driven pulley so as to be driven by rotation of the drive pulley is known to be configured as a sheet conveying device or a photoconductor belt unit for an image forming apparatus such as copying machines, printers and facsimiles. Such a belt driving device is also known to be configured as a device for conveying various products or a device for transmitting power.

In such a belt drive device, if the belt shifts in a width-wise direction while being driven, products being conveyed by the belt can not be properly conveyed. Therefore, the belt driving device generally has a device to correct shifting of the belt.

For example, a belt driving device is known in which a flange is provided at axial ends of a pulley around which an endless belt is spanned for regulating shifting of the belt in its width-wise direction. However, in such a device, when the width of the belt is wide, for example, as in a sheet conveying device for an image forming apparatus, the belt is shifted by a relatively strong force and thereby an end of the belt is abutted against the flange with a strong pressure which results in damage to the end of the belt.

Also, it is known that a pulley around which a belt is placed is formed in a drum-like shape for preventing the belt from shifting. Further, a belt shift correcting device is known in which shifting is corrected by utilizing behavior of a part of a belt protruding over an axial end edge of a pulley around which the belt is wound. However, these devices have a deficiency in that shifting of a relatively wide belt can not be effectively corrected.

Additionally, a method of correcting shifting of a wide belt is known in which shifting of the belt is detected by a detecting device and the degree from horizontal of a pulley around which the belt is wound is adjusted in accordance with a result of detecting shifting of the belt. However, the structure of a device incorporating this method is complicated and the cost is high.

SUMMARY OF THE INVENTION

In order to overcome the above-described and other problems with background devices, preferred embodiments of the present invention provide a belt driving device capable of effectively correcting shifting of a belt with a simple configuration.

According to a preferred embodiment of the present invention, a belt driving device in which an endless belt spans around a drive pulley and a driven pulley and the endless belt is driven by rotation of the drive pulley includes a belt shift correcting member for correcting shifting of the endless belt. When the endless belt is shifted towards one side in an axial direction of one of the drive pulley and the driven pulley, the belt shift correcting member increases an angle of a circumference of said one of the drive and driven pulleys contacting a width-wise end part of the endless belt at said one side in the axial direction of said one of the drive and driven pulleys such that the angle of the circumference of said one of the drive end driven pulleys contacting the width-wise end part of the endless belt at said one side in the axial direction of said one of the drive and driven pulleys is larger at a part of said one of the drive and driven pulleys contacting an edge part of said width-wise end part of the endless belt than at other parts of said one of the drive and driven pulleys contacting other parts of said width-wise end part of the endless belt, and further such that said angle of the circumference of said one of the drive and driven pulleys contacting said width-wise end part of the endless belt decreases toward a part of said one of the drive and driven pulleys contacting a width-wise center part of the endless belt. Additionally, a coefficient of friction of said one of the drive and driven pulleys relative to the endless belt is made higher at a circumferential surface of an axial end part thereof, which comes in contact with said width-wise end part of the endless belt at said one side in the axial direction of said one of the drive and driven pulleys, than at a circumferential surface of an axial center part of said one of the drive and driven pulleys.

The belt shift correcting member may preferably include a belt shift correcting roller which is rotatably arranged upstream of said one of the drive and driven pulleys in a belt driven direction such that the belt shift correcting roller contacts and presses a surface of the width-wise end part of the endless belt at said one side in the axial direction of said one of the drive and driven pulleys so as to bend the width-wise end part of the endless belt.

The belt shift correcting roller may have a rotational axis substantially parallel to said one of the drive and driven pulleys and be tapered towards the width-wise center part of the endless belt.

Alternatively, the belt shift correcting roller may include a needle-like shaped roller which is inclined such that an angle at a circumference of said one of the drive and driven pulleys contacting the endless belt increases at a part of said one of the drive and driven pulleys contacting said width-wise end part of the endless belt at said one side in the axial direction of said one of the drive and driven pulleys.

Still alternatively, the belt shift correcting member may include an umbrella-like shaped roller having a rotational axis perpendicular to said one of the drive and driven pulleys and an outer circumferential surface tapered such that an angle at a circumference of said one of the drive and driven pulleys contacting the endless belt increases at a part of said one of the drive and driven pulleys contacting said width-wise end part of the endless belt at said one side in the axial direction of said one of the drive and driven pulleys.

In another embodiment of the invention, a belt driving device in which an endless belt spans around a drive pulley and a driven pulley and the endless belt is driven by rotation of the drive pulley includes a belt shift correcting member for correcting shifting of the endless belt. The belt shift correcting member has a belt shift correcting surface which has an angle. The angle slopes from a first position to a second position. The second position on the angled surface is located farther away from a width-wise center part of the endless belt along an axial direction of one of the drive pulley and the driven pulley than does the first position. Furthermore, the first position is located on one side of a thickness-wise center part of the endless belt and the second position is located on another side of the thickness-wise center part of the endless belt. The belt shift correcting surface of the belt shift correcting member contacts a width-wise end part of the endless belt. Additionally, a coefficient of friction of one of the driven and drive pulleys relative to the endless belt is higher at a circumferential surface of an axial end part thereof than at a circumferential surface of an axial center part of the one of the drive and driven pulleys.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DESCRIPTION OF THE PREFERRED EMBODIMENTS

Referring now to the drawings, wherein like reference numerals designate identical or corresponding parts throughout the several views, preferred embodiments of the present invention are now described.

Figure 1:
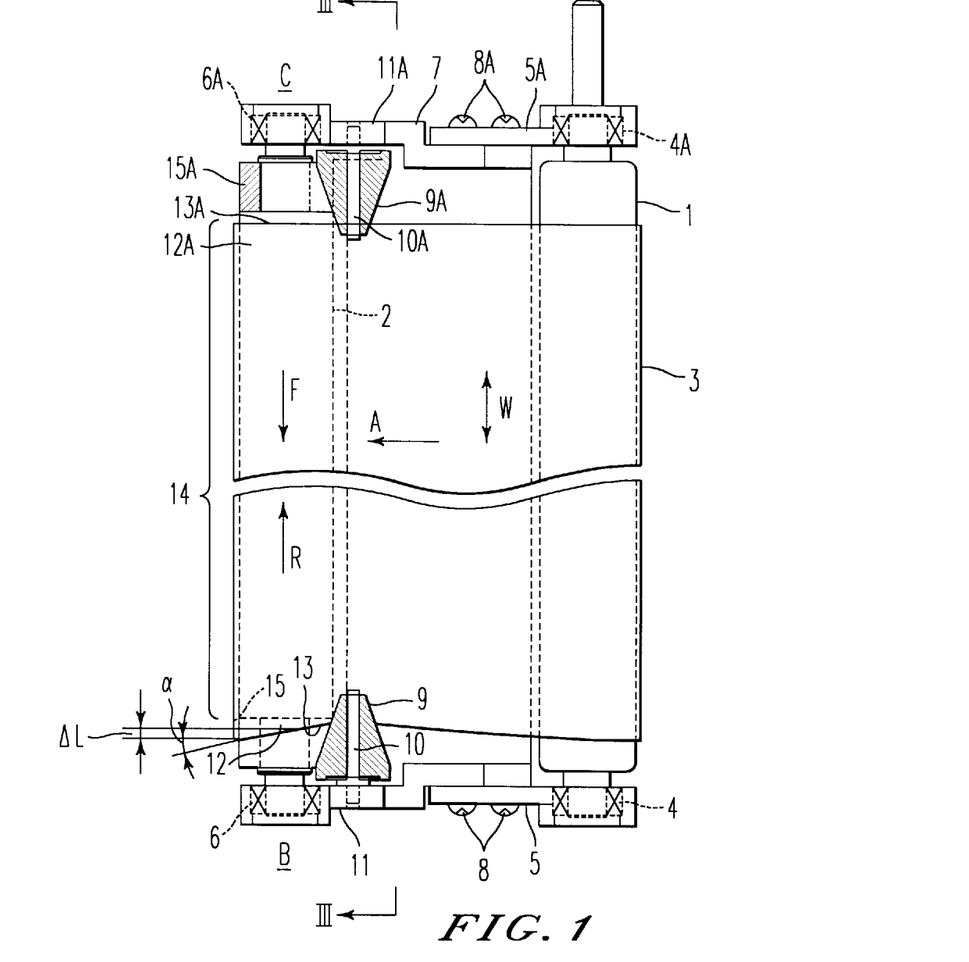
FIG. 1 is a plan view illustrating a belt driving device according to a preferred embodiment present invention.
Figure 2:
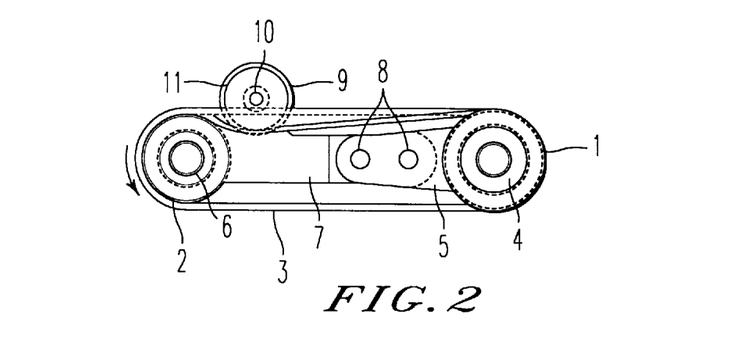
FIG. 2 is a front view of the belt driving device shown in FIG. 1.
Figure 3:
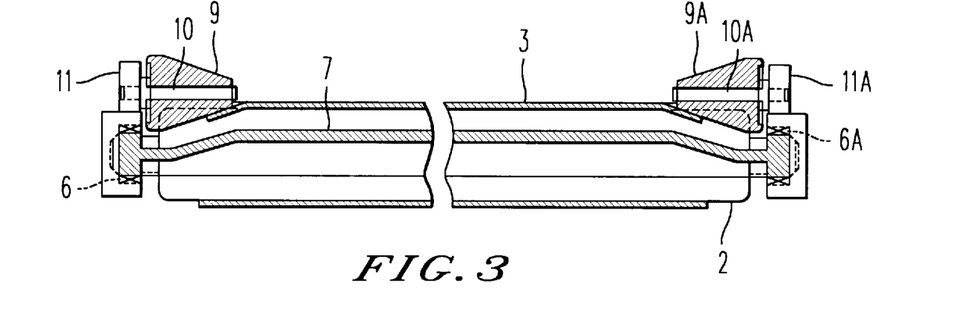
FIG. 3 is a sectional view of the belt driving device taken along a line indicated by III—III in FIG. 1.

FIG. 1 is a plan view illustrating a belt driving device according to a preferred embodiment of the present invention, which may be incorporated, for example, in an image forming apparatus (not shown) as a sheet conveying device for conveying a sheet. FIG. 2 is a front view of the belt driving device and FIG. 3 is a sectional view of the device taken along a line indicated by III—III in FIG. 1. The belt driving device includes, as illustrated in these drawings, an endless belt 3 which is spanned around a drive pulley 1 and a driven pulley 2. The pulleys 1 and 2 are separated from each other and are arranged substantially in parallel to each other. The belt driving device may also be configured such that the endless belt 3 is spanned around three or more pulleys. The endless belt 3 is made of a flexible material such as, for example, rubber.

The drive pulley 1 is rotatably supported by support arms 5 and 5A via bearings 4 and 4A which are incorporated in a part of an axis of the pulley 1 where the pulley 1 is supported by each of the support arms 5 and 5A. The driven pulley 2 is also rotatably supported by support frame 7 via bearings 6 and 6A which are incorporated in a part of an axis of the pulley 2 where the pulley 2 is supported by the frame 7. The support arms 5 and 5A are fixed to the support frame 7 with screws 8 and 8A, respectively, in a detachable manner. These support arms 5 and 5A and support frame 7 comprise the support device to rotatably support the drive pulley 1 and the driven pulley 2.

The drive pulley 1 is rotated in a counter-clockwise direction in FIG. 2 by a drive device (not shown) and thereby the endless belt 3 is driven in a direction indicated by an arrow A and the driven pulley 2 is rotated by the driven belt 3 in the counter-clockwise direction. Thus, the endless belt 3 is driven by rotation of the drive pulley 1. A direction denoted by W in FIG. 1 indicates a width-wise direction of the endless belt 3, which is perpendicular to the driven direction of the endless belt 3.

Belt shift correcting members, comprising tapered rollers 9 and 9A are provided in the vicinity of axial ends of the driven pulley 2, respectively. The tapered rollers 9 and 9A are tapered toward the width-wise center of the endless belt 3 and rotatably supported by supporting pins 10 and 10A, respectively. The support pins 10 and 10A extend in a direction substantially parallel to the driven pulley 2, and base end parts of the support pins 10 and 10A are fixed to protruding parts 11 and 11A of the support frame 7, respectively. Thus, each of the tapered rollers 9 and 9A has a rotational axis which is substantially parallel to the driven pulley 2. Each of the tapered rollers 9 and 9A is located upstream of the driven pulley 2 relative to the driven direction of the endless belt 3 and faces the upper surface of the endless belt 3. The tapered rollers 9 and 9A contact and press the surface of the endless belt 3 as described later.

FIG. 1 illustrates a state of the endless belt 3 being shifted toward the side B in the axial direction of the driven pulley 2 due to a shifting force F forcing the endless belt 3 to be shifted toward the side B. If the endless belt 3 shifts toward the side B as in this state, a part of the endless belt 3 immediately before contacting the driven pulley 2 comes beneath the tapered roller 9 and the upper surface of that part of the endless belt 3 contacts the tapered roller 9 to be pressed downward, and thereby the pressed part of the endless belt 3 is bent downward. Namely, a width-wise end part 12 of the endless belt 3 at the side B is pressed by the tapered roller 9 to be bent downward such that the angle at the circumference of the driven pulley 2 in contact with the endless belt 3 becomes larger at the part of the pulley 2 where the width-wise end part 12 of the endless belt 3 contacts than at the other part of the pulley 2 where the other part of the endless belt 3 contacts the pulley 2. Further, because the tapered roller 9 is tapered toward the width-wise center of the endless belt 3, the angle at the circumference of the driven pulley 2 in contact with the endless belt 3 is larger at the part of the pulley 2 where an edge part 13 of the endless belt 3 is in contact with the pulley 2 than at any other parts of the pulley 2 where the other parts of the endless belt 3 contacts the pulley 2 and the angle decreases towards the width-wise center of the endless belt 3.

Thus, the endless belt 3 which is shifted by a shifting force F toward the side B contacts the belt shift correcting member comprising the tapered roller 9, which is provided at the side B, and thereby the part of the endless belt 3 contacting the tapered roller 9 is bent toward the rotational axis of the driven pulley 2. Because of this bending of the endless belt 3, the edge part 13 of the endless belt 3 at the side B is wound around the driven pulley 2 with an angle α as illustrated in FIG. 1. Therefore, the endless belt 3 which is shifted toward the side B is moved back to the other side C opposite the side B. Thus, the tapered roller 9 applies to the endless belt 3 a shift correcting force R which acts to move back the endless belt 3 in the direction opposite the direction in which the endless belt 3 was first shifted, and thereby shifting of the endless belt 3 is corrected.

When a shifting force in the direction opposite the direction of the shifting force F is applied to the endless belt 3 so as to shift the endless belt 3 to the side C, the shifting is corrected in a similar manner as described above by the belt shift correcting member comprising the tapered roller 9A, which is provided at the side C. In FIG. 1, a width-wise end part of the endless belt 3 at the side C and an edge part thereof are denoted as 12A and 13A respectively.

When the endless belt 3 is shifted back as described above by the shift correction 5 force R, if it is assumed that the endless belt 3 is moved without slipping relative to the circumferential surface of the driven pulley 2, the endless belt 3 is moved back, for example, toward the side C, by a distance denoted by ΔL in FIG. 1. However, in reality, because the endless belt 3 is slipped relative to the circumferential surface of the driven pulley 2 in the direction the endless belt 3 has been shifted, the endless belt 3 is moved back toward the side C opposite the shifted side B by a distance which is shorter than the distance ΔL by a small amount. If slippage of the endless belt 3 is made less, the actual distance the endless belt 3 is moved back becomes longer.

In the above-described belt driving device according to the preferred embodiment of the present invention, therefore, for reducing slippage of the endless belt 3 relative to the 1 5 circumferential surface of the driven pulley 2 in the direction the endless belt 3 has been shifted, the coefficient of friction of the circumferential surface of the driven pulley 2 relative to the endless belt 3 is made higher at axial end part circumferential surfaces 15 and 15A than at an axial center part circumferential surface 14. For example, the axial center part circumferential surface 14 of the driven pulley 2 is made of aluminum having a flat surface and the axial end part circumferential surfaces 15 and 15A are made of chloroprene rubber in a ring form. When the endless belt 3 is shifted toward the side B of the driven pulley 2, the end part 12 of the endless belt 3 contacts the axial end part circumferential surface 15 of the driven pulley 2, which is made of rubber. Accordingly, when the endless belt 3 is moved back by the tapered roller 9 of the belt shift correcting member, slippage of the endless belt 3 relative to the circumferential surface of the driven pulley 2 is made less because of the higher coefficient of friction of the rubber and thereby the actual distance the endless belt 3 is moved back becomes longer. Thus, the effect of correcting shifting of the endless belt 3 by means of the tapered roller 9, as the belt shift correcting member, is increased by setting the coefficient of friction of the driven pulley 2 relative to the endless belt 3 higher at the axial end part circumferential surfaces 15 and 15A of the driven pulley 2.

If the coefficient of friction of the driven pulley 2 relative to the endless belt 3 at the center part circumferential surface 14 is made high, the belt 3 is excessively shifted, for example, by a slight deviation of the pulleys 1 and 2 from being parallel to each other. In other words, shifting of the endless belt 3 tends to occur if the coefficient of friction at the center part circumferential surface 14 of the driven pulley 2 is high. In the preferred embodiment described above and illustrated in FIGS. 1 though 3, the coefficient of friction at the center part circumferential surface 14 of the driven pulley 2 is made low and thereby excessive shifting of the endless belt 3 is prevented.

As described above, shifting of the endless belt 3 toward one side of the axial ends of one of the drive pulley 1 and the driven pulley 2, such as for example, to the side B of the driven pulley 2 as illustrated in FIG. 1, is more effectively corrected with the belt shift correcting member by setting the coefficient of friction of the driven pulley 2 relative to the endless belt 3 higher at the axial end part circumferential surface 15 of the driven pulley 2 than at the axial center part circumferential surface 14 of the driven pulley 2.

When the endless belt 3 is shifted toward the other side C of the driven pulley 2, correction of the shifting of the endless belt 3 by the belt shift correcting device comprising the tapered roller 9A is enhanced in a similar manner by setting the coefficient of friction of the driven pulley 2 relative to the endless belt 3 higher at the axial end part circumferential surface 15A of the driven pulley 2 than at the axial center part circumferential surface 14 of the driven pulley 2.

Figure 4:
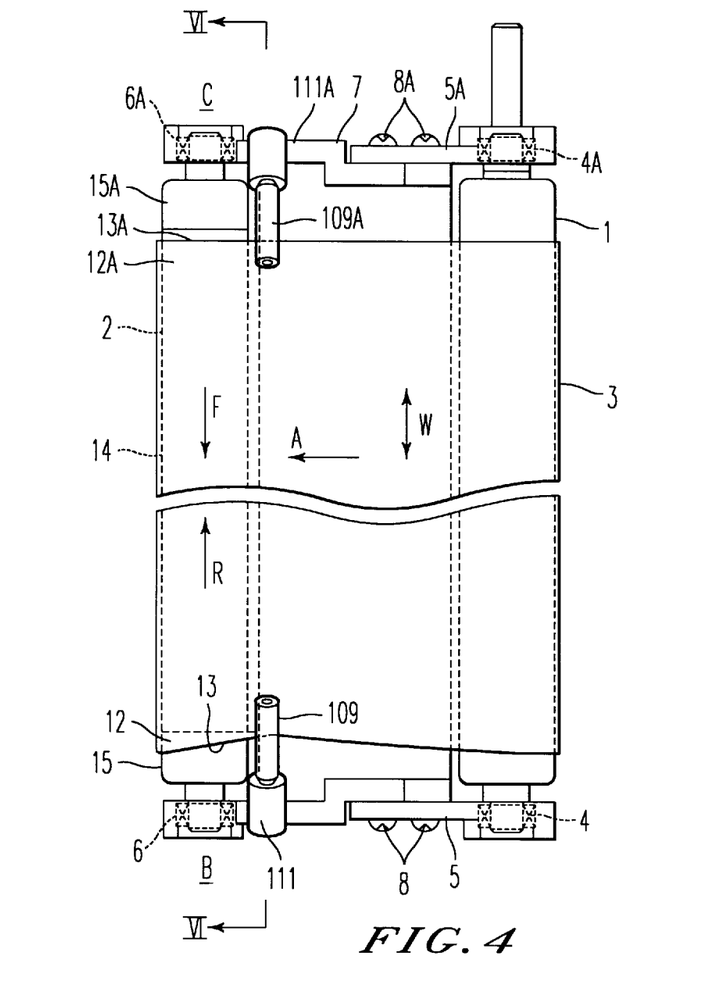
FIG. 4 is a plan view illustrating a belt driving device according to another preferred embodiment of the present invention.
Figure 5:
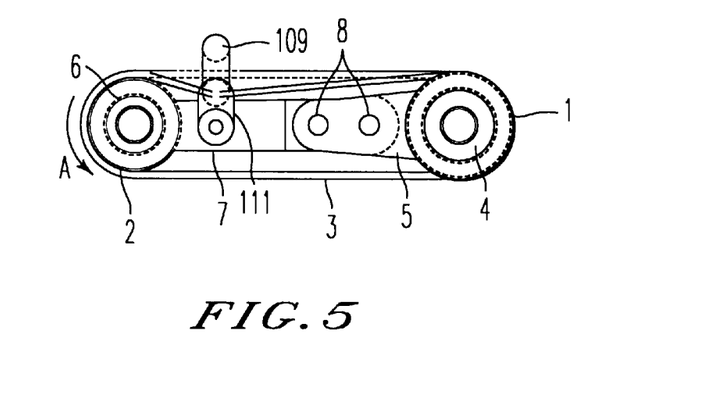
FIG. 5 is view of the belt driving device shown in FIG. 4.
Figure 6:
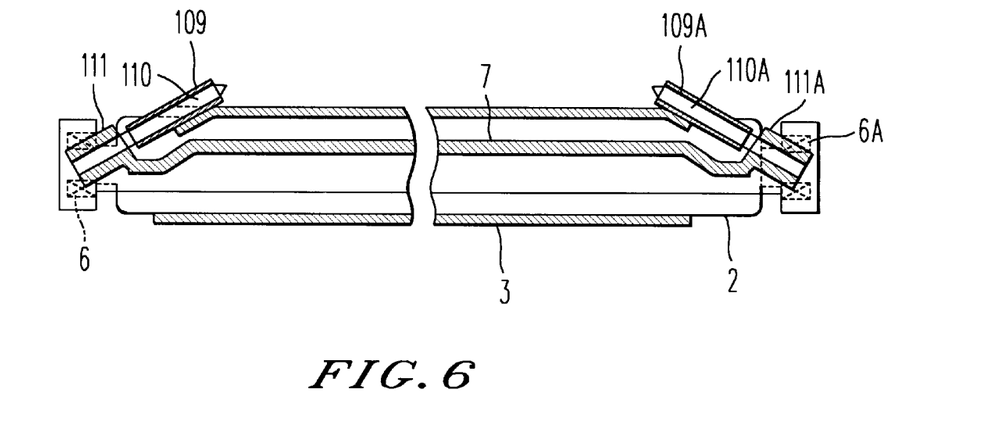
FIG. 6 is a sectional view of the belt driving device taken along a line indicated by VI—VI in FIG. 4.

FIG. 4 is a plan view illustrating a belt driving device according to another preferred embodiment of the present invention. FIG. 5 is a front view of the belt driving device and FIG. 6 is a sectional view of the device taken along a line indicated by VI—VI in FIG. 4. In this embodiment, the belt shift correcting member comprises needle-like shaped rollers 109 and 109A which are inclined such that the angle at the circumference of the driven pulley 2 in contact with the endless belt 3 becomes larger at the part contacting the width-wise end part 12 or 12A of the endless belt 3 at the axial end side B or C of the driven pulley 2 toward which the endless belt 3 is shifted. The needle-like shaped rollers 109 and 109A are rotatably supported by support pins 110 and 110A, respectively, which are fixed to axis support parts 111 and 111A, respectively, of the support frame 7 and a free end of the needle-like shaped rollers 109 and 109A located above the endless belt 3 are inclined such that the free ends come closer to each other. If the endless belt 3 is shifted to either axial end side of the driven pulley 2, the needle-like shaped roller 109 or 109A contacts a surface of the width-wise end part 12 or 12A of the endless belt 3 to bend the contacted end part 12 or 12A of the endless belt 3 and thereby the shifting of the endless belt 3 is corrected in a similar manner as in the previous embodiment.

Figure 7:
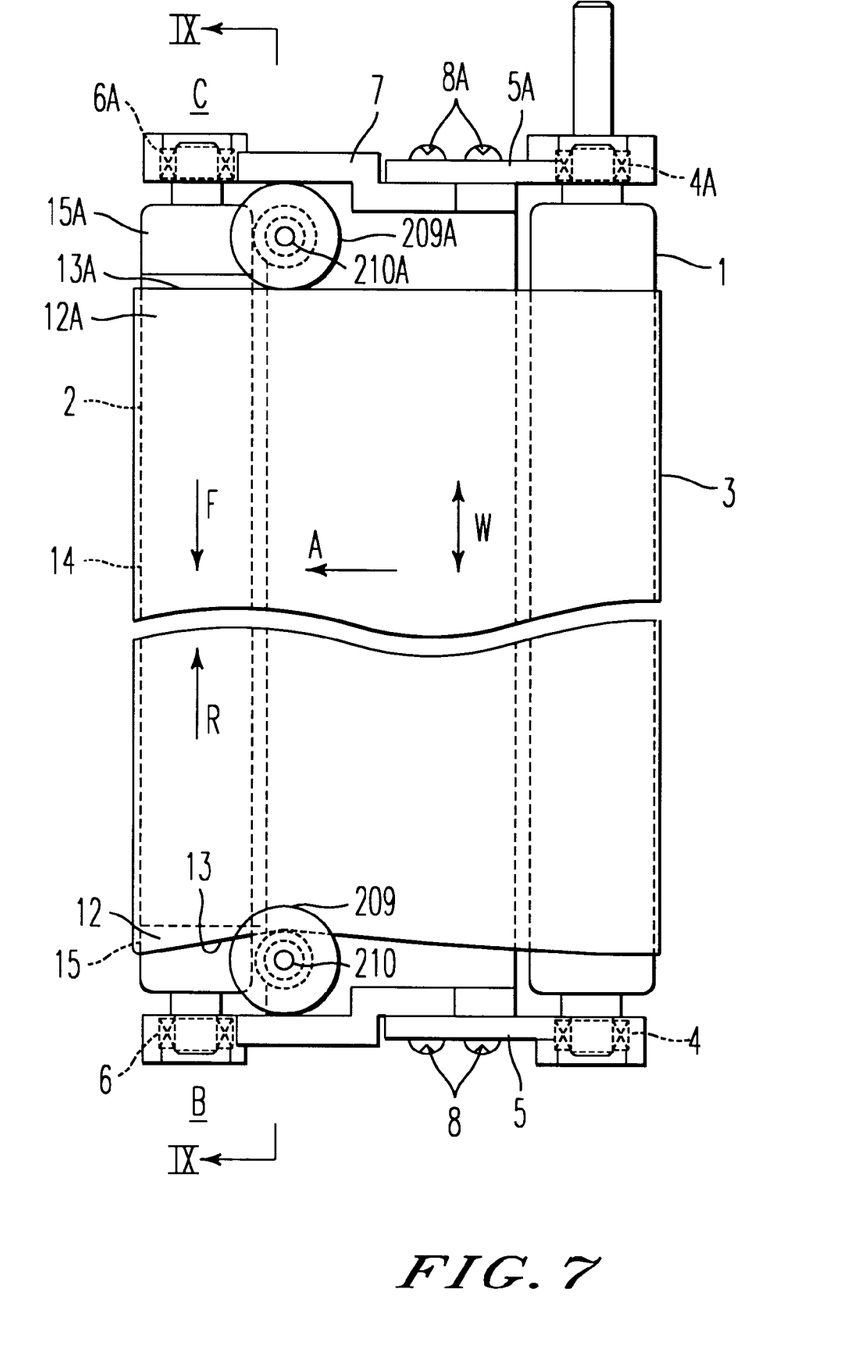
FIG. 7 is a plan view illustrating a belt driving device according to still another preferred embodiment of the present invention.
Figure 8:
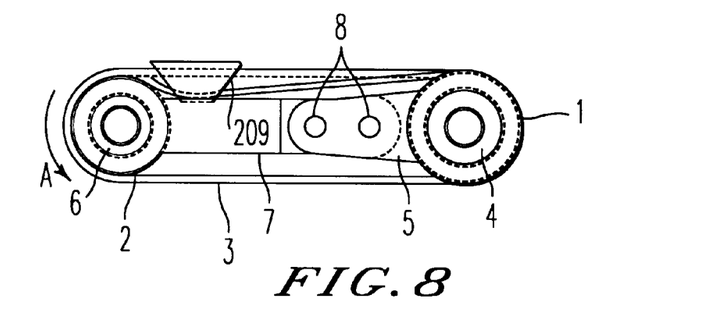
FIG. 8 is a front view of the belt driving device shown in FIG. 7.
Figure 9:
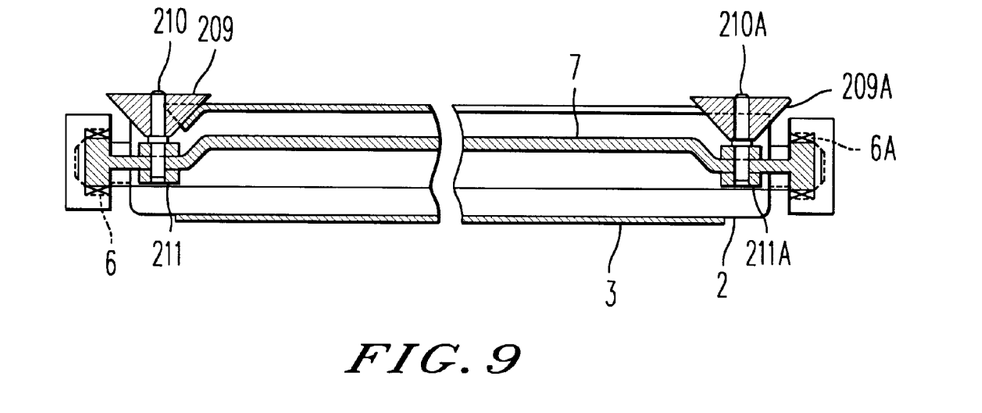
FIG. 9 is a sectional view of the belt driving device taken along a line indicated by IX—IX in FIG. 7.

FIG. 7 is a plan view illustrating a belt driving device according to still another preferred embodiment of the present invention. FIG. 8 is a front view of the belt driving device and FIG. 9 is a sectional view of the device taken along a line indicated by IX—IX in FIG. 7. In this embodiment, the belt shift correcting member comprises umbrella-like shaped rollers 209 and 209A having a rotational axis substantially perpendicular to the driven pulley 2. The umbrella-like shaped rollers 209 and 209A have an outer circumferential surface which is tapered such that the angle of the circumference of the driven pulley 2 contacting the endless belt 3 increases at the part of the pulley 2 in contact with the width-wise end part 12 or 12A of the endless belt 3 at the axial end side B or C of the driven pulley 2 toward which the endless belt 3 is shifted. The umbrella-like shaped rollers 209 and 209A are fixed to support pins 210 and 210A, respectively, which are rotatably supported by axis support parts 211 and 211A, respectively, of the support frame 7. Each of the support pins 210 and 210A protrudes perpendicularly relative to the rotational axis of the driven pulley 2 and an end part of the umbrella-like shaped rollers 209 and 209A having a larger diameter faces up. If the endless belt 3 is shifted, the umbrella-like shaped roller 209 or 209A contacts the width-wise end part 12 or 12A of the endless belt 3 to bend the contacted end part 12 or 12A of the endless belt 3 and thereby the shifting of the endless belt 3 is corrected in a similar manner as in the previous embodiments.

Thus, the belt driving devices according to the preferred embodiments of the present invention correct shifting of the belt without damaging edge parts of the belt with the provision of the belt shift correcting members as described above. Further, as illustrated in FIGS. 1 through 9, the configuration of the belt driving devices according to the preferred embodiments of the present invention are very simple and the cost of the devices are relatively low.

In the above embodiments, a pair of belt shift correcting members are provided to the driven pulley 2 and the coefficient of friction of the circumferential surface of the driven pulley 2 is set relative to the endless belt 3. However, a substantially identical pair of belt shift correcting members may also be provided to another pulley around which the endless belt 3 is spanned other than the driven pulley 2 or a substantially identical pair of belt shift correcting members may be provided to all of a plurality of pulleys around which the belt is spanned and the coefficient of friction of the circumferential surface of each of the pulleys to which the pair of belt shift correcting members are provided may be set relative to the endless belt 3.

Further, although the belt shift correcting member is provided at each of the axial end sides of the driven pulley 2, the belt shift correcting member may be provided only at one of the axial end sides of the driven pulley 2 and the coefficient of friction relative to the belts may be set higher at the axial end part circumferential surface of the driven pulley 2 at the axial end side of the pulley 2 where the belt shift correcting member is provided than at the central part circumferential surface of the driven pulley 2. In this configuration, the pulleys 1 and 2 are arranged to be slightly deviated from being parallel to each other such that the endless belt 3 is shifted to one side of the driven pulley 2, which shifting is then corrected by the belt shift correcting member.

Additionally, although the preferred embodiments of the present invention have been described for a belt driving device adapted for a sheet conveying device for image forming apparatus, the present invention may be applied to any belt driving device adapted for other applications.

Obviously, numerous additional modifications and variations of the present invention are possible in light of the above teachings. It is therefore to be understood that within the scope of the appended claims, the present invention may be practiced otherwise than as specifically described herein.

This application is based upon and claims priority of Japanese Patent Application No. 09-279738 filed in the Japanese Patent Office on Sep. 27, 1997, and the entire contents thereof are hereby incorporated by reference.

I claim:

1. A belt driving device, comprising:
   a drive pulley;
   a driven pulley;
   an endless belt which spans around the drive pulley and the driven pulley and which is driven by rotation of the drive pulley; and
   a belt shift correcting member which, when the endless belt is shifted toward one side in an axial direction of one of the drive pulley and the driven pulley, increases an angle of a circumference of said one of the drive and driven pulleys contacting a width-wise end part of the endless belt at said one side in the axial direction of said one of the drive and driven pulleys such that the angle of the circumference of said one of the drive and driven pulleys contacting said width-wise end part of the endless belt at said one side in the axial direction of said one of the drive and driven pulleys is larger at a part of said one of the drive and driven pulleys contacting an edge part of said width-wise end part of the endless belt than at other parts of said one of the drive and driven pulleys contacting other parts of said width-wise end part of the endless belt and said angle of the circumference of said one of the drive and driven pulleys contacting said width-wise end part of the endless belt decreases toward a part of said one of the drive and driven pulleys contacting a width-wise center part of the endless belt,
   wherein a coefficient of friction of said one of the drive and driven pulleys relative to the endless belt is higher at a circumferential surface of an axial end part thereof, which comes in contact with said width-wise end part of the endless belt at said one side in the axial direction of said one of the drive and driven pulleys, than at a circumferential surface of an axial center part of said one of the drive and driven pulleys.

2. The belt driving device of claim 1, wherein the belt shift correcting member comprises a belt shift correcting roller which is rotatably arranged upstream of said one of the drive and driven pulleys in a belt driven direction such that the belt shift correcting roller contacts and presses a surface of the width-wise end part of the endless belt at said one side in the axial direction of said one of the drive and driven pulleys so as to bend the width-wise end part of the endless belt.

3. The belt driving device of claim 2, wherein the belt shift correcting roller has a rotational axis substantially parallel to said one of the drive and driven pulleys and is tapered toward the width-wise center part of the endless belt.

4. The belt driving device of claim 2, wherein the belt shift correcting roller comprises a needle shaped roller which is inclined such that the angle at a circumference of said one of the drive and driven pulleys contacting the endless belt increases at a part of said one of the drive and driven pulleys contacting said width-wise end part of the endless belt at said one side in the axial direction of said one of the drive and driven pulleys.

5. The belt driving device of claim 2, wherein the belt shift correcting member comprises an umbrella shaped roller having a rotational axis perpendicular to said one of the drive and driven pulleys and an outer circumferential surface tapered such that the angle at a circumference of said one of the drive and driven pulleys contacting the endless belt increases at a part of said one of the drive and driven pulleys contacting said width-wise end part of the endless belt at said one side in the axial direction of said one of the drive and driven pulleys.

6. A belt driving device, comprising:
   a drive pulley;
   a driven pulley;
   an endless belt which spans around the drive pulley and the driven pulley and which is driven by rotation of the drive pulley; and
   a belt shift correcting member having a belt shift correcting surface, the belt shift correcting surface has an angle, the angle slopes from a first position to a second position, where the second position is located farther away from a width-wise center part of the endless belt along an axial direction of one of the drive pulley and the driven pulley than does the first position, and where the first position is located on one side of a thickness-wise center part of the endless belt and the second position is located on another side of the thickness-wise center part of the endless belt,
   wherein the belt shift correcting surface of the belt shift correcting member contacts a width-wise end part of the endless belt, and wherein a coefficient of friction of said one of the drive and driven pulleys relative to the endless belt is higher at a circumferential surface of an axial end part thereof than at a circumferential surface of an axial center part of said one of the drive and driven pulleys.

7. The belt driving device of claim 6, wherein the belt shift correcting member comprises a belt shift correcting roller which is rotatably arranged upstream of said one of the drive and driven pulleys in a belt driven direction such that the belt shift correcting roller contacts and presses a surface of the width-wise end part of the endless belt at said one side in the axial direction of said one of the drive and driven pulleys so as to bend the width-wise end part of the endless belt.

8. The belt driving device of claim 7, wherein the belt shift correcting roller has a rotational axis substantially parallel to said one of the drive and driven pulleys.

9. The belt driving device of claim 7, wherein the belt shift correcting roller comprises a needle shaped roller.

10. The belt driving device of claim 7, wherein the belt shift correcting member comprises an umbrella shaped roller.

* * * * *